United States Patent
Kocagoez et al.

(10) Patent No.: US 12,150,052 B2
(45) Date of Patent: Nov. 19, 2024

(54) POWER EFFICIENT BEAM RECOVERY PROCEDURES

(71) Applicant: Apple Inc., Cupertino, CA (US)

(72) Inventors: Kenan Kocagoez, Furth (DE); Franz Eder, Neubiberg (DE)

(73) Assignee: Apple Inc., Cupertino, CA (US)

( * ) Notice: Subject to any disclaimer, the term of this patent is extended or adjusted under 35 U.S.C. 154(b) by 323 days.

(21) Appl. No.: 17/448,440

(22) Filed: Sep. 22, 2021

(65) Prior Publication Data

US 2023/0088966 A1    Mar. 23, 2023

(51) Int. Cl.
*H04W 52/02* (2009.01)
*H04W 24/08* (2009.01)

(52) U.S. Cl.
CPC ....... *H04W 52/0212* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 2016/0050653 | A1* | 2/2016 | Rastogi | H04W 24/08 455/453 |
| 2019/0306924 | A1* | 10/2019 | Zhang | H04B 7/063 |
| 2020/0053824 | A1* | 2/2020 | He | H04B 17/309 |
| 2020/0328796 | A1* | 10/2020 | Turtinen | H04B 7/0695 |
| 2021/0092003 | A1* | 3/2021 | Zhou | H04B 7/0695 |
| 2021/0144569 | A1* | 5/2021 | Zhou | H04W 8/24 |
| 2021/0160126 | A1* | 5/2021 | Cirik | H04L 41/0654 |
| 2021/0218457 | A1* | 7/2021 | Xu | H04B 7/088 |
| 2021/0235292 | A1* | 7/2021 | Zhang | H04B 7/0695 |
| 2021/0320838 | A1* | 10/2021 | Lee | H04L 5/0048 |
| 2021/0336687 | A1* | 10/2021 | Pezeshki | H04B 7/088 |
| 2021/0368403 | A1* | 11/2021 | Wu | H04W 76/30 |
| 2021/0392717 | A1* | 12/2021 | Ryu | H04L 5/0051 |
| 2022/0022065 | A1* | 1/2022 | Wang | H04B 7/0695 |
| 2022/0060240 | A1* | 2/2022 | Xia | H04B 7/088 |
| 2022/0103226 | A1* | 3/2022 | Huang | H04B 7/0695 |
| 2022/0103419 | A1* | 3/2022 | Zhou | H04W 72/23 |
| 2022/0104044 | A1* | 3/2022 | Huang | H04W 24/08 |
| 2022/0104147 | A1* | 3/2022 | Cui | H04L 5/0048 |
| 2022/0131591 | A1* | 4/2022 | Huang | H04L 5/0051 |
| 2022/0167397 | A1* | 5/2022 | Thangarasa | H04W 74/08 |
| 2022/0224393 | A1* | 7/2022 | Gao | H04W 76/19 |

(Continued)

FOREIGN PATENT DOCUMENTS

WO    WO-2021254590 A1 * 12/2021

*Primary Examiner* — Christopher T Wyllie
(74) *Attorney, Agent, or Firm* — Fay Kaplun & Marcin, LLP (57) ABSTRACT

A user equipment (UE) is configured to determine a probability metric for a likelihood of a beam failure event at the UE, implement a beam management power saving scheme based on the probability metric and process a portion of network scheduled beam recovery resources within a time window. A UE may also be configured to generate a radio link monitoring (RLM) block error rate (BLER) metric associated with a beam, determine that the RLM BLER metric is below a threshold value and disable beam failure detection (BFD) and candidate beam detection (CBD) procedures at the UE in response to determining that the RLM BLER metric is below the threshold value.

14 Claims, 6 Drawing Sheets

(56) References Cited

U.S. PATENT DOCUMENTS

| | | | |
|---|---|---|---|
| 2022/0271887 A1* | 8/2022 | Zhang | H04L 5/0032 |
| 2022/0302989 A1* | 9/2022 | Zhang | H04W 74/0841 |
| 2022/0303795 A1* | 9/2022 | Bala | H04W 24/08 |
| 2022/0303807 A1* | 9/2022 | Cui | H04W 24/10 |
| 2022/0360314 A1* | 11/2022 | Zhu | H04W 72/02 |
| 2022/0386150 A1* | 12/2022 | Eldessoki | H04W 24/04 |
| 2023/0053871 A1* | 2/2023 | Tran | H04B 7/088 |
| 2023/0069021 A1* | 3/2023 | Zhou | H04W 52/0216 |
| 2023/0088597 A1* | 3/2023 | Alfarhan | H04W 24/08 |
| | | | 370/252 |
| 2023/0164712 A1* | 5/2023 | Kim | H04L 5/0053 |
| | | | 370/350 |
| 2023/0199528 A1* | 6/2023 | Kang | H04W 24/08 |
| | | | 370/328 |
| 2023/0269816 A1* | 8/2023 | Zhou | H04B 17/373 |
| | | | 370/328 |
| 2023/0299839 A1* | 9/2023 | Harada | H04B 7/024 |
| | | | 375/262 |

* cited by examiner

POWER EFFICIENT BEAM RECOVERY PROCEDURES

BACKGROUND

Signaling between a user equipment (UE) and a network may be achieved via beamforming. Beamforming is an antenna technique used to transmit a directional signal which may be referred to as a beam. Beam management generally refers to a set of procedures configured to acquire and maintain a beam between a user equipment (UE) and a transmission reception point (TRP) deployed by the network. Beam management procedures may include various operations related to beam recovery.

The UE may be configured with time windows during which the UE is to monitor for different types of network resources associated with beam recovery, e.g., reference signals, synchronization signal blocks (SSBs), etc. Outside of the time windows the UE may have an opportunity to sleep and conserve power. Under conventional circumstances, the UE processes the network resources regardless of how likely beam recovery is to be triggered at the UE. This is an inefficient use of the UE's limited power supply. Accordingly, there is a need for techniques that mitigate the inefficient power consumption associated with beam recovery at the UE.

SUMMARY

Some exemplary embodiments are related to a processor of a user equipment (UE) configured to perform operations. The operations include determining a probability metric for a likelihood of a beam failure event at the UE, implementing a beam management power saving scheme based on the probability metric and processing a portion of network scheduled beam recovery resources within a time window.

Other exemplary embodiments are related to a processor of a user equipment (UE) configured to perform operations. The operations include generating a radio link monitoring (RLM) block error rate (BLER) metric associated with a beam, determining that the RLM BLER metric is below a threshold value and disabling beam failure detection (BFD) and candidate beam detection (CBD) procedures at the UE in response to determining that the RLM BLER metric is below the threshold value.

Still further exemplary embodiments are related to a user equipment (UE) having a transceiver configured to communicate with a network and a processor communicatively coupled to the transceiver and configured to perform operations. The operations include determining a probability metric for a likelihood of a beam failure event at the UE, implementing a beam management power saving scheme based on the probability metric and processing a portion of network scheduled beam recovery resources within a time window.

Additional exemplary embodiments are related to a user equipment (UE) having a transceiver configured to communicate with a network and a processor communicatively coupled to the transceiver and configured to perform operations. The operations include generating a radio link monitoring (RLM) block error rate (BLER) metric associated with a beam, determining that the RLM BLER metric is below a threshold value and disabling beam failure detection (BFD) and candidate beam detection (CBD) procedures at the UE in response to determining that the RLM BLER metric is below the threshold value.

DETAILED DESCRIPTION

The exemplary embodiments may be further understood with reference to the following description and the related appended drawings, wherein like elements are provided with the same reference numerals. The exemplary embodiments relate to beam management. Those skilled in the art will understand that beam management generally refers to a set of procedures configured to acquire and maintain a beam between a user equipment (UE) and a transmission reception point (TRP). As will be described in more detail below, various exemplary techniques are introduced that are configured to reduce the load of beam management activities on the UE.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to a 5G New Radio (NR) network. However, reference to a 5G NR network is merely provided for illustrative purposes. The exemplary embodiments may be utilized with any network that utilizes beamforming. Therefore, the 5G NR network as described herein may represent any type of network that implements beamforming.

A person of ordinary skill in the art would understand that beamforming is an antenna technique that is utilized to transmit or receive a directional signal. From the perspective of a transmitting device, beamforming may refer to propagating a directional signal. Throughout this description, a beamformed signal may be referred to as a "beam" or a "transmitter beam." The transmitter beam may be generated by having a plurality of antenna elements radiate the same signal. Increasing the number of antenna elements radiating the signal decreases the width of the radiation pattern and increases the gain. Thus, a transmitter beam may vary in width and be propagated in any of a plurality of different directions.

From the perspective of a receiving device, beamforming may refer to tuning a receiver to listen to a direction of interest. Throughout this description, the spatial area encompassed by the receiver listening in the direction of interest may be referred to as a "beam" or a "receiver beam." The receiver beam may be generated by configuring the parameters of a spatial filter on a receiver antenna array to listen in a direction of interest and filter out any noise from outside the direction of interest. Like a transmitter beam, a receiver beam may also vary in width and be directed in any of a plurality of different areas of interest.

In addition, the exemplary embodiments are described with regard to a base station that is a next generation node B (gNB) that is configured with multiple TRPs. Throughout this description, a TRP generally refers to a set of components configured to transmit and/or receive a beam. In some embodiments, multiple TRPs may be deployed locally at the gNB. For example, the gNB may include multiple antenna arrays/panels that are each configured to generate a different beam. In other embodiments, multiple TRPs may be deployed at various different locations and connected to the gNB via a backhaul connection. For example, multiple small cells may be deployed at different locations and connected to the gNB. However, these examples are merely provided for illustrative purposes. Those skilled in the art will understand that TRPs are configured to be adaptable to a wide variety of different conditions and deployment scenarios. Thus, any reference to a TRP being a particular network component or multiple TRPs being deployed in a particular arrangement is merely provided for illustrative purposes. The TRPs described herein may represent any type of network component configured to transmit and/or receive a beam.

In a 5G network, beamforming may occur over the millimeter wave (mmW) spectrum. The mmW spectrum is comprised of frequency bands that each have a wavelength of 1-10 millimeters. These frequency bands may be located between, approximately, 8 gigahertz (GHz) and 300 GHz. However, any reference to a particular network or a particular type of base station is merely provided for illustrative purposes. The exemplary embodiments may apply to any type of network and any type of base station within the corresponding network that is configured to communicate with the UE over the mmW spectrum or any other similar concept.

A UE configured for beamforming may be equipped with various radio frequency (RF) panels (e.g., one or more antenna elements, RF circuitry, etc.) and each RF panel may support a set of beam codebooks. These components and features may have relatively high power requirements which may strain UE battery and/or UE temperature limits. In addition, beam management procedures such as, beam failure recovery (BFR), beam failure detection (BFD) and candidate beam detection (CBD) may require monitoring for and processing of various types of network resources. This type of data exchange processing may cause the UE to experience a power drain. As will be described in more detail below, the exemplary embodiments introduce techniques for reducing the load of beam management procedures on the UE.

The UE may be configured with a power saving mode and an active mode of data exchange processing. The active mode of data exchange processing may refer to the UE performing operations that enable the UE to receive information and/or data from the network. For example, within the context of beam management, the UE may be configured with a scheduled time window during which the UE is to utilize the active mode of data exchange processing to monitor for and process network resources. These resources may include, but are not limited to, channel state information (CSI)-reference signal (RS) and synchronization signal blocks (SSBs). In one example, a scheduled time window during which the UE is to utilize the active mode of data exchange processing may be an onDuration of a discontinuous reception (DRX) cycle. In another example, a scheduled time window during which the UE is to utilize the active mode of data exchange processing may be triggered by a wake-up signal or any other type of signal indicating that information and/or data is scheduled for the UE. However, the above examples are merely provided for illustrative purposes. The exemplary embodiments relate to reducing the active mode of data exchange processing performed for the purpose of beam management.

Outside of a scheduled time window, the UE may have the opportunity to utilize a sleep mode of inactivity and conserve power. Reference to a power saving mode or a sleep mode of inactivity does not necessarily mean putting the processor, the transmitter, and the receiver of the UE to sleep, in hibernation, or in deactivation. For example, the processor (e.g., baseband and/or application) may continue to execute other applications or processes. The sleep mode relates to conserving power by discontinuing a continuous processing functionality relating to operations that enable the UE to receive data that may be transmitted to the UE and transmit data to the network.

As mentioned above, the exemplary embodiments introduce techniques for reducing the load of beam management procedures on the UE. This may include reducing the amount of time in which the UE is in the active mode of data exchange processing to perform operations related to beam management. In one aspect, the exemplary embodiments introduce a filter that enables the UE to adequately balance beam recovery performance and the dynamic UE power and/or UE temperature constraints. For instances, when a beam failure event is likely, the UE may process all of the network scheduled beam recovery resources. When a beam failure event is less likely, the UE may utilize only a portion of the network scheduled beam recovery resources and thus, the UE may reduce the amount of active data exchange processing performed for beam management operations. In another aspect, the exemplary embodiments may enable the UE to temporarily pause certain beam management procedures entirely. The exemplary techniques described herein may partially or fully enable the UE to control certain beam management procedures on a UE need basis instead of relying solely on network scheduling. Each of these exemplary aspects will be described in more detail below. The exemplary techniques described herein may be used in conjunction with currently implement beam management procedures, future implementations of beam management procedures or independently from other beam management procedures.

Figure 1:
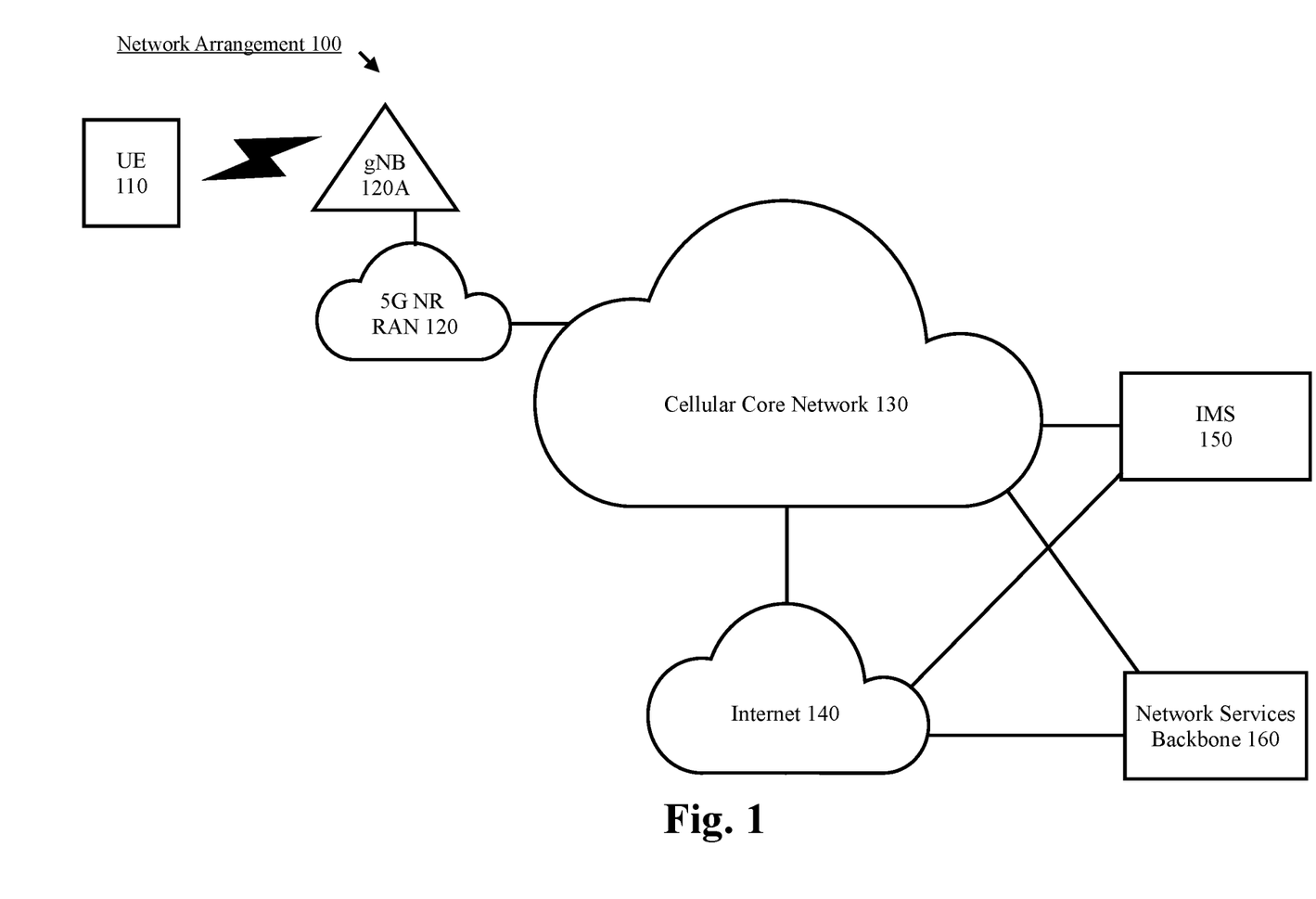
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 includes a gNB 120A that is configured with multiple TRPs. Each TRP may represent one or more components configured to transmit and/or receive a beam. In some embodiments, multiple TRPs may be deployed locally at the gNB 120A. In other embodiments, multiple TRPs may be distributed at different locations and connected to the gNB 120A via a backhaul connection. In either configuration, each TRP may transmit a beam to and/or receive a beam from the UE 110. However, the gNB 120A may be configured to control the TRPs and perform operations such as, but not limited to, scheduling resources, implementing beam management techniques, etc. Those skilled in the art will understand that 5G NR TRPs are adaptable to a wide variety of different conditions and deployment scenarios. An actual network arrangement may include any number of different types of base stations and/or TRPs being deployed by any number of RANs in any appropriate arrangement. Thus, the example of a single gNB 120A in FIG. 1 is merely provided for illustrative purposes.

The UE 110 may connect to the 5G NR-RAN 120 via the gNB 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., gNB 120A). However, as mentioned above, reference to the 5G NR-RAN 120 is merely for illustrative purposes and any appropriate type of RAN may be used.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
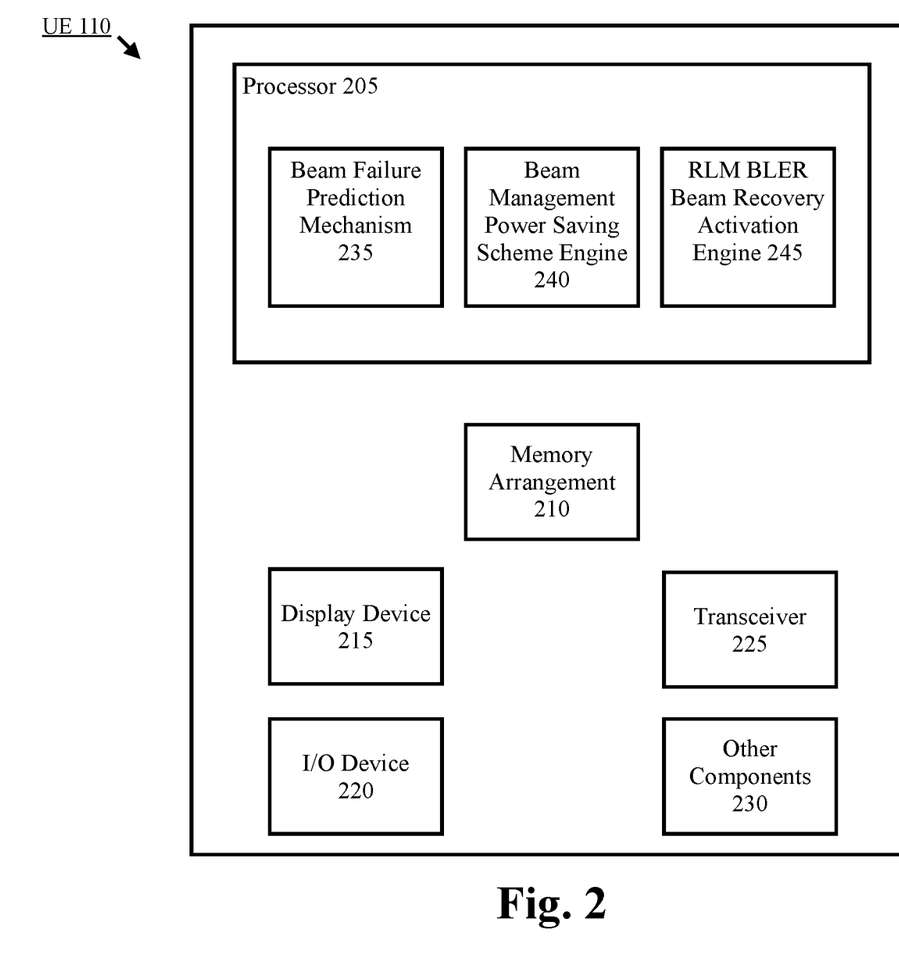
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a beam failure prediction mechanism 235, a beam management power saving scheme engine 240 and a RLM BLER beam recovery activation engine 245. The beam failure prediction mechanism 235 may be trained to generate a beam failure probability metric that indicates to the UE 110 the likelihood of a subsequent beam failure event. The beam management power saving scheme engine 240 may control whether beam recovery resources are processed by the UE 110. The RLM BLER beam recovery activation engine 245 may enable and disable certain beam recovery operations based on a RLM BLER metric.

The above referenced engines 235-245 being an application (e.g., a program) executed by the processor 205 is merely provided for illustrative purposes. The functionality associated with the engines 235-245 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and/or any other appropriate type of network. Accordingly, the transceiver 225 may operate on a variety of different frequencies or channels (e.g., set of consecutive frequencies).

Figure 3:
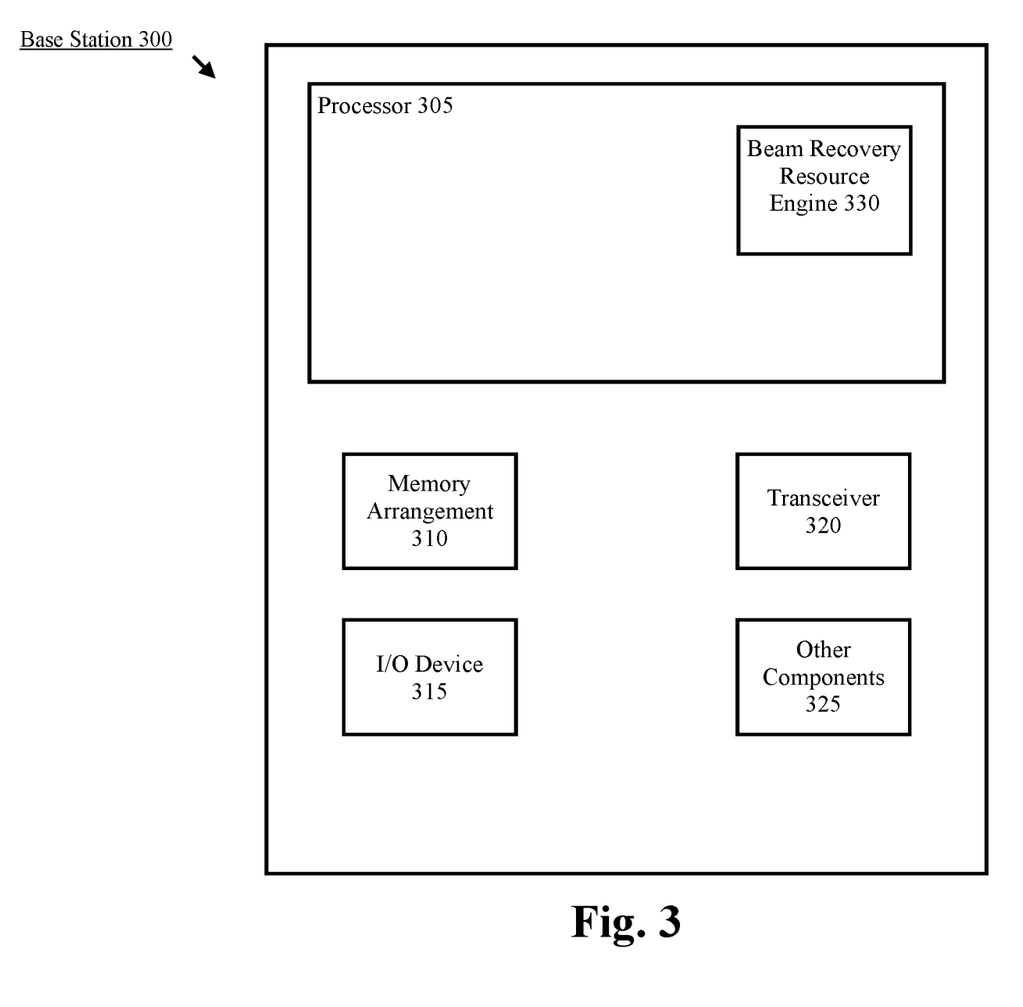
FIG. 3 shows an exemplary base station according to various exemplary embodiments.

FIG. 3 shows an exemplary base station 300 according to various exemplary embodiments. The base station 300 may represent any access node (e.g., gNB 120A, etc.) through which the UE 110 may establish a connection and manage network operations.

The base station 300 may include a processor 305, a memory arrangement 310, an input/output (I/O) device 315, a transceiver 320, and other components 325. The other components 325 may include, for example, a battery, a data acquisition device, ports to electrically connect the base station 300 to other electronic devices, etc.

The processor 305 may be configured to execute a plurality of engines of the base station 300. For example, the engine may include a beam recovery resource engine 330. The beam recovery resource engine 330 may perform various operations related to scheduling and transmitting beam recovery resources such as, but not limited to, CBD-SSB, CBD-CSI-RS, BFD-SSB, BFD-CSI-RS.

The above noted engine 330 being an application (e.g., a program) executed by the processor 305 is only exemplary. The functionality associated with the engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the system 100. The transceiver 320 may operate on a variety of different frequencies or channels (e.g., set of consecutive frequencies). Therefore, the transceiver 320 may include one or more components (e.g., radios) to enable the data exchange with the various networks and UEs.

As mentioned above, the exemplary embodiments relate to beam management. The term beam management may encompass a variety of different procedures including, but not limited to, BFD, BFR and CBD. For BFD, a base station (e.g., gNB 120A) may configure BFD reference signals and the UE 110 may collect measurement data based on the BFD reference signals. The UE 110 may declare a beam failure when a beam failure triggering condition has been met. For instance, a beam failure condition may comprise identifying that a number of beam failure instance indications from the physical layer reaches a configured threshold before a configured timer expires. The beam failure instance indications may be based, at least in part, on the measurement data collected from the BFD reference signals.

To differentiate between different beam management procedures, reference signals for BFD may be referred to as BFD-CSI-RS and BFD-SSB. However, the use of the terms "BFD-CSI-RS" and "BFD-SSB" is merely provided for illustrative purposes. The exemplary embodiments may apply to BFD performed on the basis of any appropriate type of reference signal.

After a beam failure event is declared, the UE 110 may identify candidate beams and trigger a BFR procedure. For CBD, a beam may be configured with CBD reference signals and the UE 110 may collect measurement data based on the CBD reference signals. The UE 110 may then identify one or more beams and report the candidate beam information to the network by transmitting a BFR request to the network. The UE 110 may then monitor for a response to the BFR request transmitted on one of the candidate beams identified by the UE 110. The BFR request and the response to the BFR request may be part of a random access channel (RACH) procedure. When the RACH procedure is complete, BFR may be considered complete. The above example is merely provided for illustrative purposes, the term "CBD" may refer to any procedure in which the UE 110 searches for a beam that may be used by the network to provide the UE 110 with information and/or data.

To differentiate between different beam management procedures, reference signals for CBD may be referred to as CBD-CSI-RS and CBD-SSB. However, the use of the terms "CBD-CSI-RS" and "CBD-SSB" is merely provided for illustrative purposes. The exemplary embodiments may apply to CBD performed on the basis of any appropriate type of reference signal.

The exemplary embodiments introduce techniques for the UE 110 to reduce the amount of time in which the active mode of data exchange processing is utilized for beam management procedures related to beam recovery (e.g., BFD, CBD, BFR, etc.). For instance, under conventional circumstances, the network scheduled BFD and CBD resources may be processed by the UE 110 regardless of how likely a beam failure event is to occur. Thus, the UE 110 is frequently utilizing the active mode of data exchange processing to monitor for and process BFD and CBD resources despite it being unlikely that a beam failure event is to be declared. This is an inefficient use of the power supply of the UE 110. The exemplary embodiments enable the UE 110 to partially or fully enable certain procedures related to beam recovery (e.g., BFD, BFR, CBD) based on the UE 110 without sole reliance on the network scheduled resources.

As will be described in detail below, multiple observation points and/or measurement data points may be used in a heuristic approach to filter network scheduled beam recovery resources (e.g., BFD-CSI-RS, BFD-SSB, CBD-CSI-RS, CBD-SSB, etc.). For instance, different combinations of observation points and/or measurement data points may be used to predict the likelihood or probability of a beam failure event during a subsequent time window. When a beam failure event is likely to occur, all of the network scheduled beam recovery resources may be processed by the UE 110 during the time window. When a beam failure event is less likely to occur, a portion of the beam recovery resources may be processed by the UE 110 during the time window. The level of partial processing may be based on predefined conditions related to the UE 110 power supply and UE 110 temperature. Thus, in some embodiments, when a UE 110 is concerned about the power supply and/or the temperature of the UE 110, the UE 110 may exclude more beam recovery resources from processing and utilize the sleep mode of inactivity to conserve power and/or for thermal recovery.

When deployed, each individual UE may have a different sensitivity to beam failures. For example, the characteristics of each UE (e.g., the size of the UE, the number of RF panels, etc.) may cause the device to be more or less susceptible to beam failures. In addition, how the UE is to be utilized may also have an effect on beam failures events because the motion of the UE (e.g., mobility, rotation, etc.) may cause the device to be more susceptible to beam failures. The exemplary embodiments introduce a beam failure prediction mechanism that may be trained to predict beam failure occasions for devices that have certain characteristics or are to be utilized in a particular manner.

Figure 4:
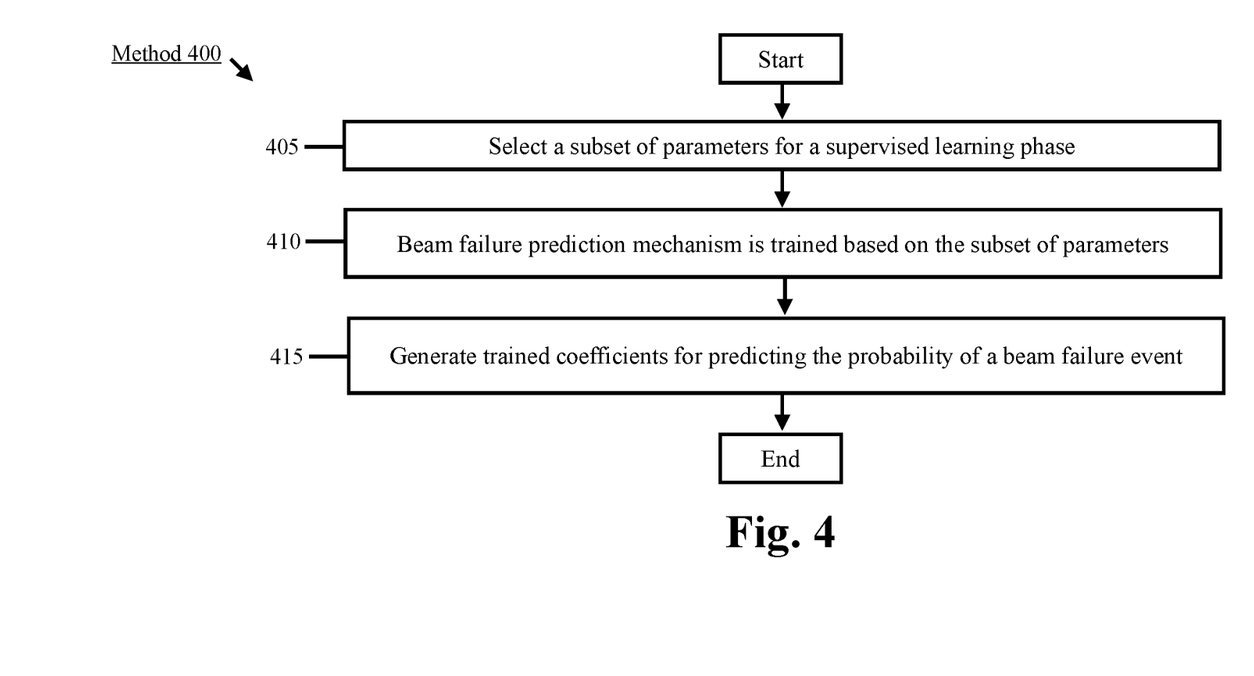
FIG. 4 shows a method for training a beam failure prediction mechanism according to various exemplary embodiments.

FIG. 4 shows a method 400 for training a beam failure prediction mechanism according to various exemplary embodiments. As indicated above, each individual UE may have a different sensitivity to beam failures. The method 400 demonstrates how to train a beam failure prediction mechanism 235 to predict beam failure events for a particular UE or type of UE. As will be shown with regard to the method 500 of FIG. 5, once trained, this beam failure prediction mechanism 235 may be used by the UE 110 to determine whether to utilize an active mode of data exchange processing for beam recovery purposes.

Training the beam failure prediction mechanism 235 will be described from the perspective of the UE 110. In one example, this training may occur before the UE 110 is deployed by an end user. For example, the manufacturer or a third party may train the mechanism 235 based on certain device characteristics (e.g., size, number of RF panels, etc.) and/or simulating motion that is expected to be experienced by a particular type of device (e.g., mobility, rotation, etc.). Once trained, the UE 110 may be configured with a beam failure prediction mechanism 235 that is trained for the device characteristics and expected behavior of the UE 110. In another example, the beam failure prediction mechanism 235 may be trained when the UE 110 is deployed by the end user. For instance, the training may take place in the background when the UE 110 is deployed by the end user or the training may be based on data collected by the UE 110 when deployed. The training may be a continuous process over the life cycle of the UE 110 or the UE 110 may be preconfigured with a trained beam failure prediction mechanism 235 that may or may not be updated remotely. However, any reference to the training occurring in a particular manner is merely provided for illustrative purposes. The exemplary embodiments may train the beam failure prediction mechanism 235 and/or configure the beam failure prediction mechanism 235 in any appropriate manner.

In 405, a subset of parameters is selected for a supervised learning phase. For instance, the beam failure prediction mechanism 235 may be initially deployed in a training phase for learning a dependency of parameters with regard to a beam failure occasion. To provide an example, the UE 110 may be deployed and interact with the network in a variety of different ways. When deployed, the UE 110 may monitor for beam failure indications and record observation points and/or measurement data points associated with a set of parameters. This information may indicate which parameters are relevant to beam failure recovery for a particular UE or type of UE (e.g., UE 110, etc.).

The set of parameters that include, but is not limited to, a state of a look-up table with candidate beams for the serving cell in a radio resource control (RRC) connected mode, a temperature sensor parameter, a power supply parameter, a battery state of the UE 110, motion sensor parameters (e.g., gyroscope, accelerometer), layer 1 (L1)-reference signal received power (RSRP) based on CSI-SSB, L1-signal-to-interference-to-noise (SINR) based on CSI-SSB, L1-RSRP based on CSI-RS, L1-RSRP based on CSI-RS, BFD-SSB based hypothetical physical downlink control channel BLER, BFD-CSI-RS based hypothetical physical downlink control channel BLER, RLM-SSB based hypothetical physical downlink control channel BLER, RLM-CSI-RS hypothetical physical downlink control channel BLER, UE channel parameter estimated based on tracking reference signal (TRS), demodulation reference signal (DMRS) resources for indication of doppler/delay spread. A subset of these parameters may then be selected for further training. The above example parameters are merely provided for illustrative purposes, the exemplary embodiments may utilize any appropriate parameters for training the beam failure prediction mechanism 235.

In 410, the beam failure prediction mechanism 235 is trained based on the subset of parameters. This may be referred to as the supervised learning phase. Here, the beam failure prediction mechanism 235 may learn the combination and/or weighing of parameters for predicting a beam failure event that is device and/or user dependent. For example, parameters such as L1-RSRP, L1-SINR, TRS, DMRS, motion sensor data, RLM BLER and BFD BLER measurements may be utilized for learning correlation weights to beam failure events for a particular UE or type of UE (e.g., UE 110, etc.).

In 415, trained coefficients are generated for predicting the probability of a beam failure event. The trained coefficients may be generated from the supervised learning phase and represent correlation weights corresponding to the subset of parameters. As will be described below with regard to FIG. 5, the trained coefficients may be used when the UE 110 is deployed by the end user to predict a beam failure event.

Figure 5:
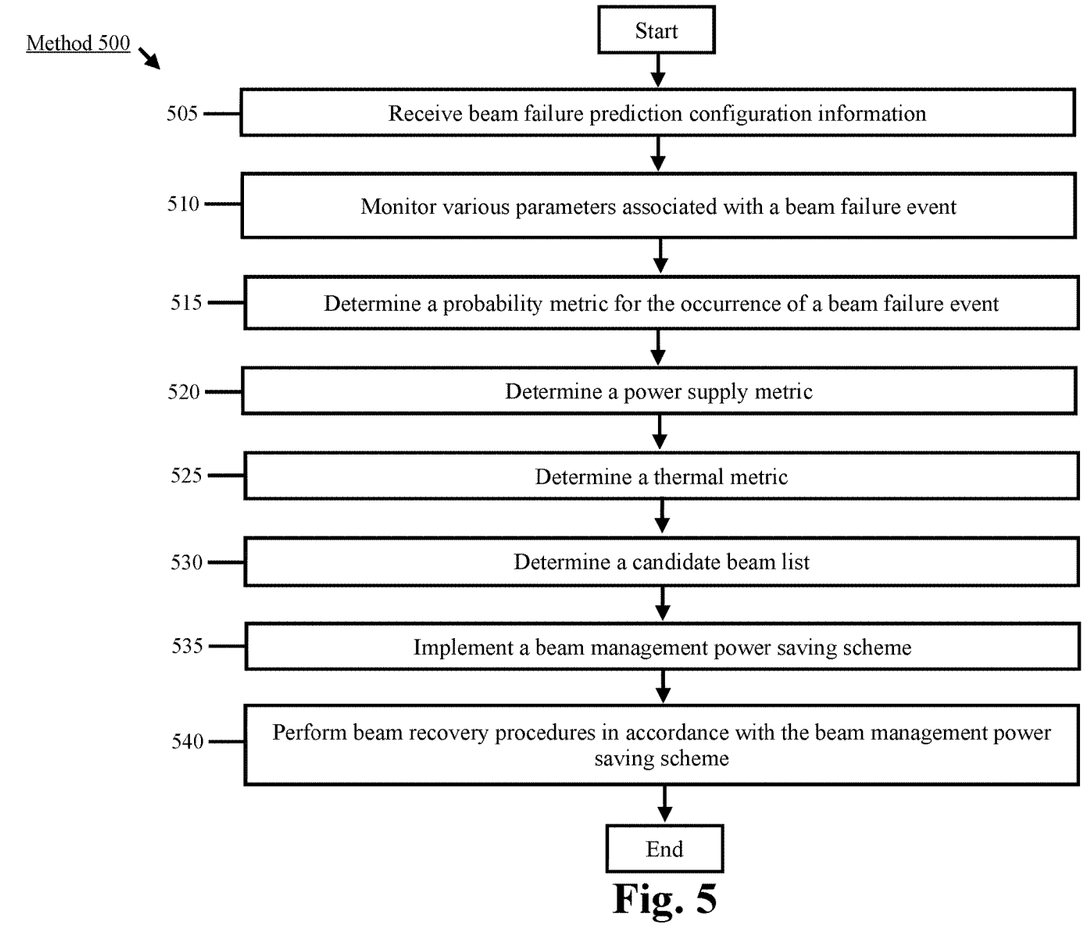
FIG. 5 shows a method for power efficient beam recovery operations according to various exemplary embodiments.

FIG. 5 shows a method 500 for power efficient beam recovery operations according to various exemplary embodiments. The method 500 will be described with regard to the UE 110 of FIG. 2 and the network arrangement 100 of FIG. 1.

In 505, the UE 110 receives beam failure prediction configuration information. This configuration information may be used by the beam failure prediction mechanism 235 to determine a probability metric for a potential beam failure event. For example, the beam failure prediction configuration information may include parameters, observation points and/or measurements data points that may indicate a beam failure event is to occur. In addition, the beam failure prediction configuration information may include the trained coefficients, threshold values, counter or frequency values that may be used in association with the parameters, observation points and/or measurements data points to determine a probability metric for a potential beam failure event.

As indicated above, the UE 110 may be preconfigured with this configuration information, the UE 110 may receive this configuration information from the network or a third party and/or the UE 110 may generate this configuration information on its own. The exemplary embodiments apply to the UE 110 being provided the beam failure prediction configuration information in any appropriate manner.

In 510, the UE 110 monitors various parameters associated with a beam failure event. In this example, the parameters may include L1-RSRP, L1-SINR, TRS, DMRS, motion sensor data, RLM BLER and BFD BLER. However, these parameters are merely provided for illustrative purposes and the exemplary embodiments may apply to any type of one or more parameters being used to predict the occurrence of a beam failure event.

In 515, the UE 110 determines a probability metric for the occurrence of a beam failure event. The probability metric may be based on observation points and/or measurement data points associated with the parameters being tracked in 510. In addition, the parameters may be weighted with the trained coefficients. The observation points and/or measurement data points may be monitored for a certain frequency of warning indications, threshold crossings and/or gradient crossings over time to determine the probability metric. The probability metric may be updated dynamically based on the changing observation points.

Throughout this description, the probability metric may be characterized as "high probability," "medium probability" and "low probability." Each of these categories may represent a range of values or conditions. However, reference to three categories is merely provided for illustrative purposes. The exemplary embodiments may characterize the likelihood of a beam failure event in any appropriate manner.

In 520, the UE 110 determines a power supply metric. For example, the UE 110 may monitor the battery life and determine an amount of power available to the UE 110. As will be described in more detail below, the power supply metric may be used to control the amount of active data exchange processing performed by the UE 110 for beam recovery purposes.

In 525, the UE 110 determines a thermal metric. For example, the UE 110 may be equipped with sensors that monitor the thermal levels of the UE 110. As will be described in more detail below, the thermal metric may be used to control the amount of active data exchange processing performed by the UE 110 for beam recovery purposes.

In 530, the UE 110 determines an existing candidate beam list. For instance, the UE 110 may be configured by the network to evaluate certain candidate beams with respect to measured RSRP. This may be used for a fallback solution if a beam failure occurs when the probability metric indicates that a beam failure is unlikely to occur, e.g., a high probability. Thus, the UE 110 would have a chance to trigger a recovery process on previously measured candidate beams even when certain beam recovery procedures may be disabled or throttled down.

In 535, the UE 110 implements a beam management power saving scheme. The UE 110 may be configured with multiple different beam management power saving schemes and may select one of the power saving schemes based on the probability metric, the power supply metric, the thermal metric and/or any other appropriate information. The beam management power saving scheme may determine the amount of time the UE 110 utilizes the active mode of data exchange processing for beam recovery procedures.

As indicated above, the method 500 is a continuous and dynamic process. Thus, the probability metric, thermal metric and power supply metric may be monitored and updated during operation. Thus, the beam management power saving scheme may also be updated to adapt to the current conditions of the UE 110. This allows the UE 110 to find an adequate balance between beam recovery, performance and power saving.

In 540, the UE 110 performs beam recovery procedures in accordance with the beam management power saving scheme. The beam management power saving scheme may provide a tradeoff between beam failure probability and the existing candidate beam list versus UE 110 power and temperature alarms to select the activity level with regard to candidate beam detection and beam recovery.

When there is a high probability of a beam failure event, the UE 110 may perform beam recovery procedures in the default manner. Thus, the UE 110 may utilize the active mode of data exchange processing to monitor and process network scheduled beam recovery resources (e.g., CBD-SSB, CBD-CSI-RS, BFD-SSB, BFD-CSI-RS, etc.).

When there is a medium or low probability, partial processing of the beam recovery resources may be performed. Thus, instead of utilizing the active mode of data exchange processing to monitor for and process network scheduled resources, the UE 110 may utilize the sleep mode of inactivity when a network scheduled beam recovery resource (e.g., CBD-SSB, CBD-CSI-RS, BFD-SSB, BFD-CSI-RS, etc.) is expected to arrive at the UE 110. In some embodiments, instead of utilizing the sleep mode of inactivity, the UE 110 may omit or discard the network scheduled beam recovery resources.

To provide an example, during a CBD-SSB transmission there may be four orthogonal frequency division multiplexing (OFDM) symbols occupied without any other data. Accordingly, only CBD-SSB symbols may occupy these symbols repetitively over time. In some scenarios, there may be 56 candidate beams scheduled by the network and each candidate beam may require multiple CBD-SSBs to allow time filtering. Thus, there is a vast amount of OFDM symbols to be processed for beam failure recovery. The beam management power saving scheme may cause the UE 110 to only process these symbols when it is necessary for beam recovery.

In another aspect, the exemplary embodiments relate to enabling and disabling certain beam management procedures based on RLM. For instance, an RLM-BLER condition may be implemented that triggers the UE 110 to temporarily pause the BFD and CBD procedures entirely.

Figure 6:
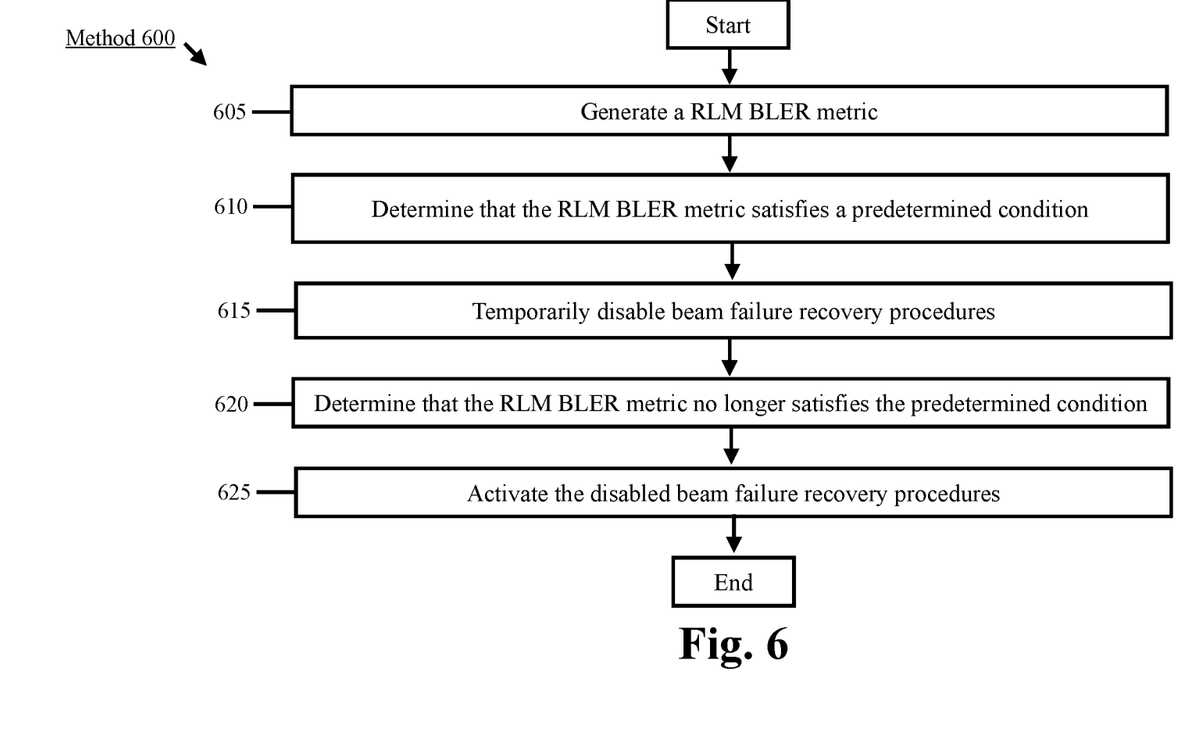
FIG. 6 shows a method for selectively enabling beam recovery procedures according to various exemplary embodiments.

FIG. 6 shows a method 600 for selectively enabling beam recovery procedures according to various exemplary embodiments. The method 600 will be described with regard to the UE 110 of FIG. 2 and the network arrangement 100 of FIG. 1.

In 605, the UE 110 generates a RLM BLER metric. The RLM BLER metric may be an instantaneous or averaged BLER values during a time window.

In 610, the UE 110 determines that the RLM BLER metric satisfies a predetermined condition. For example, the UE 110 may be configured with a threshold value. If the RLM BLER metric is below the threshold value this may indicate to the UE 110 a beam failure event is not likely to occur.

In 615, the UE 110 temporarily disable certain beam failure recovery procedures (e.g., CBD, BFD, etc.). This allows the UE 110 to utilize the sleep mode of inactivity even when network resources such as, but not limited to, CBD-SSB, CBD-CSI-RS, BFD-SSB, BFD-CSI-RS are scheduled by the network. In some embodiments, instead of utilizing the sleep mode of inactivity, the UE 110 may omit or discard the network scheduled beam recovery resources.

In 620, the UE 110 determines that the RLM BLER metric no longer satisfies the predetermined condition. For example, if the RLM BLER metric is above the threshold value this may indicate to the UE 110 a beam failure event is likely to occur.

In 625, the UE 110 actives the disabled beam failure recovery procedures. Thus, the BFD and CBD procedures may be selectively enabled and disabled to provided power saving benefits to the UE 110 or for mitigating device temperature.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   determining a probability metric for a likelihood of a beam failure event at the UE, wherein the probability metric is based on coefficients, trained over time, that are determined based on at least one parameter associated with measured characteristics of at least one signal received by the UE;
   selecting a beam management power saving scheme from a plurality of beam management power saving schemes based on the probability metric and at least one of a power supply metric and a thermal metric;
   triggering the selected beam management power saving scheme; and
   processing a portion of network scheduled beam recovery resources based on the triggered beam management power within a time window.

2. The processor of claim 1, wherein processing the portion of the network scheduled beam recovery resources includes utilizing a sleep mode of inactivity when one or more beam recovery resources are scheduled by a network.

3. The processor of claim 1, wherein the beam recovery resources include channel state information (CSI)-reference signal (RS) or synchronization signal blocks (SSBs) configured for beam failure detection (BFD).

4. The processor of claim 1, wherein the beam recovery resources include channel state information (CSI)-reference signal (RS) or synchronization signal blocks (SSBs) configured for candidate beam detection (CBD).

5. The processor of claim 1, wherein the at least one parameter comprises at least one of: a layer 1 (L1)-reference signal received power (RSRP), a L1-signal-to-interference-to-noise (SINR), a tracking reference signal (TRS), a demodulation reference signals (DMRS), a motion sensor parameters, a radio link monitoring (RLM)-block error rate (BLER) and a beam failure detection (BFD)-BLER.

6. The processor of claim 1, wherein the portion of network scheduled beam recovery resources is based on a power supply metric associated with the UE.

7. The processor of claim 1, wherein the portion of network scheduled beam recovery resources is based on a thermal metric associated with the UE.

8. A user equipment (UE), comprising:
   a transceiver configured to communicate with a network; and
   a processor communicatively coupled to the transceiver and configured to perform operations comprising:
      determining a probability metric for a likelihood of a beam failure event at the UE, wherein the probability metric is based on coefficients, trained over time, determined based on at least one parameter associated with measured characteristics of at least one signal received by the UE over time;
      triggering a beam management power saving scheme based on the probability metric, wherein the triggered beam management power saving scheme is selected from a plurality of power saving scheme based further on at least one of: a power supply metric and a thermal metric; and
      processing a portion of network scheduled beam recovery resources based on the triggered beam management power within a time window.

9. The UE of claim 8, wherein processing the portion of the network scheduled beam recovery resources includes utilizing a sleep mode of inactivity when one or more beam recovery resources are scheduled by the network.

10. The UE of claim 8, wherein the beam recovery resources include channel state information (CSI)-reference signal (RS) or synchronization signal blocks (SSBs) configured for beam failure detection (BFD).

11. The UE of claim 8, wherein the beam recovery resources include channel state information (CSI)-reference signal (RS) or synchronization signal blocks (SSBs) configured for candidate beam detection (CBD).

12. The UE of claim 8, wherein the at least one parameter comprises: at least one of: a layer 1 (L1)-reference signal received power (RSRP), a L1-signal-to-interference-to-noise (SINR), a tracking reference signal (TRS), a demodulation reference signals (DMRS), a motion sensor parameters, a radio link monitoring (RLM)-block error rate (BLER) and a beam failure detection (BFD)-BLER.

13. The UE of claim 8, wherein the portion of network scheduled beam recovery resources is based on a power supply metric associated with the UE.

14. The UE of claim 8, wherein the portion of network scheduled beam recovery resources is based on a thermal metric associated with the UE.

* * * * *